(12) United States Patent
Ellinger

(10) Patent No.: US 10,539,259 B2
(45) Date of Patent: Jan. 21, 2020

(54) LOCKING RATCHET EFFECT CLAMP

(71) Applicant: KSI Group, LLC, Savage, MN (US)

(72) Inventor: Todd Ellinger, Plymouth, MN (US)

(73) Assignee: KSI Group, LLC, Savage, MN (US)

( * ) Notice: Subject to any disclaimer, the term of this patent is extended or adjusted under 35 U.S.C. 154(b) by 74 days.

(21) Appl. No.: 15/613,413

(22) Filed: Jun. 5, 2017

(65) Prior Publication Data

US 2017/0350546 A1 Dec. 7, 2017

Related U.S. Application Data

(60) Provisional application No. 62/346,269, filed on Jun. 6, 2016.

(51) Int. Cl.
*F16L 33/08* (2006.01)
*F16L 21/06* (2006.01)

(52) U.S. Cl.
CPC ........... *F16L 33/08* (2013.01); *Y10T 24/1406* (2015.01); *Y10T 24/1412* (2015.01); *Y10T 24/1427* (2015.01)

(58) Field of Classification Search
CPC .. F16L 33/08; Y10T 24/1427; Y10T 24/1429; Y10T 24/1431; Y10T 24/14; Y10T 24/1418; Y10T 24/142; Y10T 24/1422; Y10T 24/1424; Y10T 24/1433; Y10T 24/1435; Y10T 24/1437; Y10T 24/1439; Y10T 24/1443; Y10T 24/1445; Y10T 24/1447; Y10T 24/1449; Y10T 24/1451; Y10T 24/1453; Y10T 24/1455; Y10T 24/1441
See application file for complete search history.

(56) References Cited

U.S. PATENT DOCUMENTS 2,073,294 A 3/1935 Caillau
2,504,836 A * 4/1950 Hill .......................... F16L 33/08
24/274 R (Continued)

FOREIGN PATENT DOCUMENTS

CN 103375654 A 10/2013
DE 2553046 A1 8/1976
(Continued)

*Primary Examiner* — Robert Sandy
*Assistant Examiner* — Michael S Lee
(74) *Attorney, Agent, or Firm* — Fredrikson & Byron, P.A.

(57) ABSTRACT

A clamp includes a housing, a band, and an actuating member. The housing defines and first slot and has a surface from which a first locking feature extends outwardly. The band has a first portion secured to the housing and a second portion extending within the first slot of the housing. The actuating member is seated at the housing and has a surface interfacing with the first locking feature. A plurality of mating features each extend outwardly from the surface of the actuating member and the plurality of mating features are spaced about a circumference of the surface of the actuating member. The actuating member is configured, when actuated, to move the second portion of the band relative to the housing. The first locking feature is configured to consecutively engage one of the plurality of mating features when the actuating member is actuated.

17 Claims, 11 Drawing Sheets

(56) References Cited

U.S. PATENT DOCUMENTS

| | | | | |
|---|---|---|---|---|
| 2,522,494 | A | * 9/1950 | Baldo | F16L 33/08 24/274 R |
| 2,993,671 | A | 7/1961 | Knebusch | |
| 3,311,959 | A | 4/1967 | Schaub | |
| 4,244,088 | A | * 1/1981 | Sauer | F16L 33/08 24/274 R |
| 4,300,270 | A | * 11/1981 | Sauer | F16L 33/08 24/274 R |
| 5,504,978 | A | * 4/1996 | Meyer, III | F16L 33/08 24/269 |
| 5,661,876 | A | * 9/1997 | Goldenberg | F16L 33/02 24/19 |
| 7,055,225 | B1 | * 6/2006 | Brant, Jr. | F16L 33/02 24/269 |
| 8,156,774 | B2 | 4/2012 | Tribout et al. | |
| 2003/0145436 | A1 | * 8/2003 | Storer | B65D 33/1616 24/274 R |
| 2011/0271492 | A1 | * 11/2011 | Posner | F16L 33/035 24/16 R |
| 2015/0068016 | A1 | * 3/2015 | Harris | F16B 39/20 29/428 |

FOREIGN PATENT DOCUMENTS

| | | | |
|---|---|---|---|
| EP | 0476517 | B1 | 8/1996 |
| GB | 542482 | A | 1/1942 |
| GB | 586235 | A | 3/1947 |
| GB | 607595 | A | 9/1948 |
| JP | WO2009104767 | A1 | 6/2011 |
| KR | 200158022 | Y1 | 10/1999 |

* cited by examiner

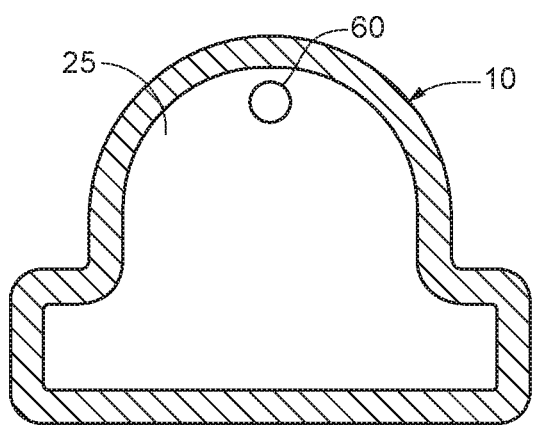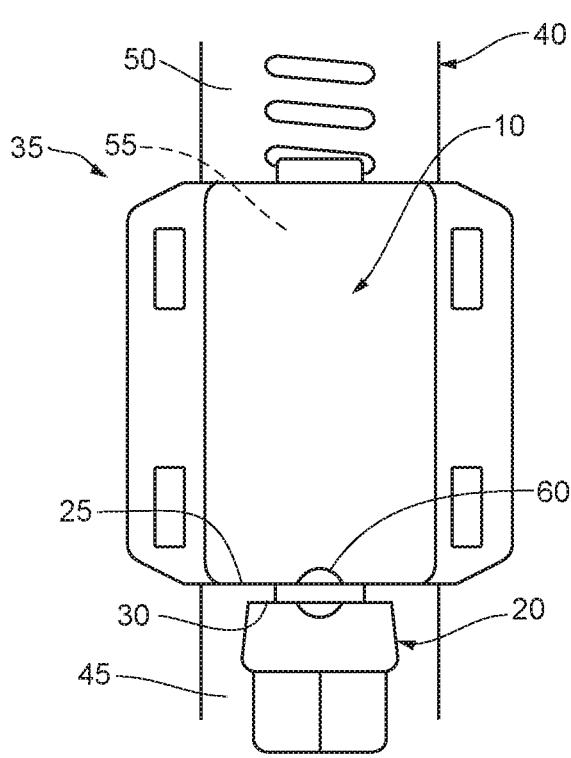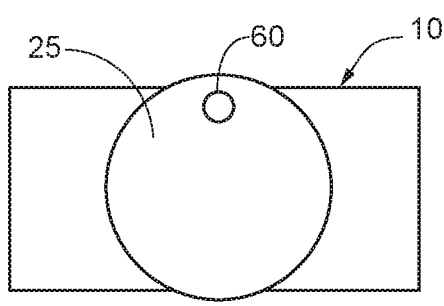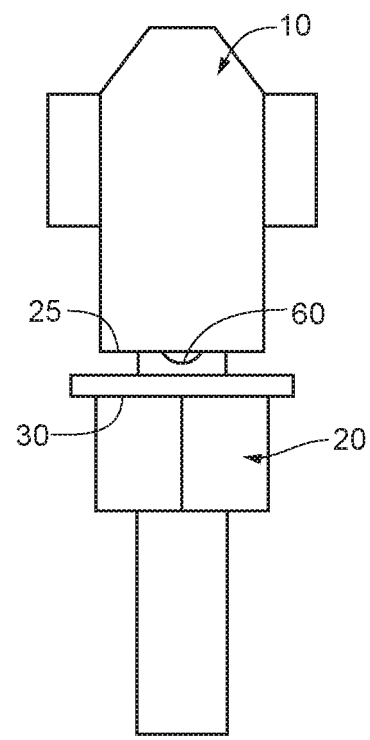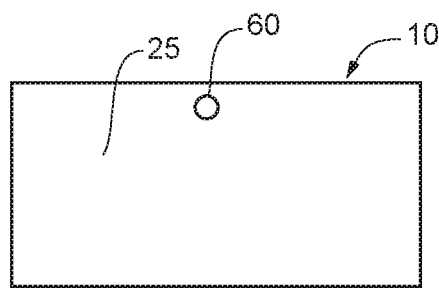

LOCKING RATCHET EFFECT CLAMP

PRIORITY CLAIM

This application claims the benefit of the filing date of U.S. provisional patent application No. 62/346,269 filed on Jun. 6, 2016, the entire contents of which are hereby incorporated by reference.

TECHNICAL FIELD

This disclosure relates generally to clamps, such as hose clamps, and methods of making and using clamps.

BACKGROUND

Hose clamps can come in a variety of forms, including worm gear hose clamps, T-Bolt, V-Band, and barrel hose clamps. Hose clamps are commonly utilized to join together hoses, tubes, fittings, connectors and other attachments, collectively referred to hereinafter as fittings, for example within the automotive, agricultural, industrial and marine industries.

In use, hose clamps are subjected and respond to a number of ambient and dynamic conditions that effect the clamp assembly. These include thermal cycling between ambient and operating temperatures, vibration, mechanical impingement to the body of the clamp, assembly expansion and contraction, and internal hose and/or fitting system pressures when applicable. These conditions combined with the general rigors of use can cause the clamp's screw, nut, bolt, or the like to loosen, such as by rotating in the direction opposite to that in which it was rotated to install and tighten the clamp. This can cause the clamp to loosen on the fitting, which may result in a loose, weakened connection, and may ultimately result in leakage, mechanical damage, and/or component failure.

In an attempt to prevent such loosening, the screw, nut or bolt may be over-torqued when installed. Over-torqueing of the worm screw, nut, or bolt is not recommended by clamp manufacturers but is often done by clamp installers with the idea that when the screw, nut, or bolt loosens it still retains enough load to prevent the clamp from loosening to a detrimental extent. However, this over-torqueing often causes the clamp to fail. For instance, this can cause the threads of the worm gear screw to deform and even break the mating components in the corresponding band material of the clamp since the clamp is manufactured to accommodate a much lower torque than that actually induced. This over-torqueing also often causes the clamp housing itself to loosen or become detached from the band entirely, which may separate the screw threads from the band causing the clamp to fail. Likewise, in the case of V-Band/T-Bolt clamps, the over torqueing of the nut causes damage to the internal threads of the nut, as well as the mating external threads of the T-bolt, making the nut subject to either seizing in place which prevents further tightening or loosening due to galling of the threads. Similarly, in the case of barrel clamps, this over-torqueing often causes internal damage to the threads of the barrel, as well as to the mating threads of the bolt, making the bolt subject to either seizing in place or loosening due to thread galling. In addition, in many instances over-torqueing of the clamp may crush or degrade the mating fittings due to the generation of excessive radial torque in the fitting/assembly.

As another attempt to reduce loosening of clamp screws, nuts, or bolts has been to use two or more clamps in the same assembly in order to generate greater total load in the mating components. This can also be subject to failure, as radial load is achieved only under each individual clamp, and adding additional clamps to a given assembly doubles, triples, etc. the cost relative to the clamps, while also significantly increasing total assembly time and user burden. Also, using two or more clamps on the same hose, fitting and or assembly is often ineffective to prevent the screw or nut on each clamp from loosening due to the operating characteristics previously described (e.g., thermal cycling).

SUMMARY

Currently existing clamps, such as hose clamps including worm gear, barrel hose, and V-Band/T-Bolt clamps, lack a user-friendly, cost effective design for substantially reducing clamp loosening after the clamp has been installed. It would be useful to have a clamp design that could be capable of withstanding the rigors of a variety of clamp applications without loosening to a detrimental extent. Moreover, it would be useful if the clamp design accomplished this while being user-friendly and cost effective.

Various exemplary embodiments are disclosed herein that provide a clamp that can be capable of withstanding the rigors of a variety of clamp applications without loosening to a detrimental extent. Furthermore, the exemplary clamp embodiments and related methods disclosed herein may accomplish this function in a manner that is user-friendly and cost-effective in installation.

In general, exemplary embodiments disclosed herein provide corresponding features on a clamp housing and a clamp actuating member. These corresponding features can cooperate during actuation (e.g., torqueing) of the clamp actuating member in a first direction to progressively lock a band at the clamp housing. For instance, a locking feature on a surface of the clamp housing can be configured to consecutively engage one of a number of mating features on a surface of the clamp actuating member as the clamp actuating member is actuated in the first direction. Upon each consecutive engagement with one of the mating features in the first direction, the band is further locked at the clamp housing. In addition, the number of mating features on the surface of the clamp actuating member can be configured to impede movement of the actuating member in a second, opposite direction after installation of the clamp. As a result, the corresponding features on the clamp housing and the clamp actuating member can provide a progressive ratcheting effect when locking the clamp in place and at the same time can help to impede detrimental loosening of the clamp caused by the rigors of a variety of clamp applications.

Thus, one exemplary aspect of embodiments described herein is to provide means of preventing the actuating member (e.g., worm drive screw, V-Band/T-Bolt nut or barrel clamp bolt) from loosening once installed by making it impeding, and in some instances preventing, rotation in the opposite direction relative to its tightened, or installed, position.

The way in which mechanical interaction and interference between the locking feature and the one or more mating features is designed and established can enable the amount of breakaway torque or untightening force required to loosen the clamp in operational use to be set or pre-determined during the clamp manufacturing process. This can vary, for instance depending upon the requirements of given application (e.g., clamp applications/installations/assemblies), by altering the manner and degree in which the locking feature and the one or more mating features interact with one another. Notably, embodiments may do so without having to change the basic operation for installing a clamp. Additionally, the manner in which the locking feature and the one or more mating features interact with one another may create a constant tension effect, whereby the prevailing pressure and mechanical interference between the locking feature and one or more mating features transmits a constant linear force or tension into the length of the actuating member. This linear force can push or draw the actuating member away from the face of the housing, resulting in an additional compressive force on the installed and fully tightened clamp inner diameter that may expand and contract to a greater degree in use along with the clamped fitting. This expansion and contraction can allow the clamp to better respond to and compensate for the dynamic elements previously described (e.g., thermal cycling), resulting in a more consistent, substantially constant sealing pressure on the assembly which may be more forgiving of the operating characteristics and environments consistent with hose clamp use.

One exemplary embodiment of a clamp includes a housing, a band, and an actuating member. The housing has a surface from which a first locking feature extends outwardly and the housing defines a first slot. The band has a first portion secured to the housing and a second portion extending within the first slot of the housing. The actuating member is seated at the housing. The actuating member has a surface interfacing with the first locking feature. A plurality of mating features each extend outwardly from the surface of the actuating member and the plurality of mating features are spaced about a circumference of the surface of the actuating member. The actuating member is configured, when actuated, to move the second portion of the band relative to the housing. The first locking feature is configured to consecutively engage one of the plurality of mating features when the actuating member is actuated and thereby progressively move the second portion of the band relative to the housing.

Another exemplary embodiment includes a method of securing a clamp. This embodiment includes bringing a first locking feature that extends outwardly from a surface of a housing into contact with a surface of an actuating member. This surface of the actuating member has a plurality of mating features each extending outwardly and spaced apart about a circumference of the surface. This embodiment of the method further includes actuating the actuating member to move a portion of a band in a first direction relative to the housing. Actuating the actuating member to move the portion of the band in the first direction relative to the housing comprises the first locking feature engaging a first mating feature of the plurality of mating features. Upon further actuation of the actuating member, the first locking feature engages a second mating feature of the plurality of mating features to further move the portion of the band in the first direction relative to the housing. The second mating feature is circumferentially spaced about the surface of the actuating member from the first mating feature.

The foregoing has outlined rather broadly the features, technical advantages and functions of certain embodiments in order that the detailed description that follows may be better understood. Additional features and advantages of embodiments will be described hereinafter. The conception and specific embodiments disclosed may be readily utilized as a basis for modifying or designing other structures or carrying out the same purposes of the described embodiments. It should also be noted that such equivalent constructions do not depart from the spirit and scope of embodiments described herein. Further objects and advantages may be better understood from the following detailed description when considered in connection with the accompanying figures. Each of the figures is provided for the purpose of illustration and description only, and is not intended to limit other embodiments whether illustrated or not. Also, although certain advantages are described, it should be understood that various changes, substitutions, modifications and alterations can be made herein without departing from the spirit and scope of the embodiments. Moreover, the scope of the present application is not intended to be limited to the particular embodiments of processes, articles of manufacture, and other forms described in the specification.

BRIEF DESCRIPTION OF THE DRAWINGS

The accompanying drawings from part of the specification in which like numerals designate like parts, illustrate certain embodiment and together with the description serves to explain particular embodiments. In the drawings:

FIGS. 2A-2J show the variety of housings of FIGS. 1A-1J with another exemplary locking feature.

DETAILED DESCRIPTION

Exemplary embodiments disclosed herein can be applicable to a variety of different types of clamps. For instance, such a clamp can include a number of different hose clamps, such as worm gear, barrel hose, and V-Band/T-Bolt clamps.

Exemplary worm gear clamps can include both clamp bands where the slots extend through the band, sometimes referred to as a "slotted band" and worm gear clamps where the slots do not extend through the band completely, but are instead formed on the surface of the band without actually penetrating the band material, referred to as an "embossed band" or "non-perforated" style clamp.

Exemplary V-Band and T-Bolt clamps can include a V-Band using the T-Bolt Clamp design as its bass chassis, with the V-Band inserts being added to the inner diameter of a T-Bolt clamp to create the V-Band clamp. Both may use a common T-bolt, nut and trunnion design as an actuation member to transmit tightening torque into the clamp inner diameter.

Exemplary barrel style clamps may be somewhat similar in nature to the V-Band/T-Bolt design, however instead of using a T-bolt/nut/trunnion, two opposing cylindrical barrels and a bolt may be used as an actuation member with the bolt extending through an unthreaded through-hole in the first barrel. The actuation member can engage the threaded hole of the second or opposing barrel to draw the two sides together in order to tighten the clamp.

Clamp embodiments disclosed herein can include two corresponding features. A first feature can be on a clamp housing while a second feature can be on a clamp actuating member. The first feature on the clamp housing can serve as a locking feature while the second feature on the clamp actuating member can serve as a mating feature. These corresponding features can cooperate during actuation (e.g., torqueing) of the clamp actuating member in a first direction to progressively lock a band at the clamp housing. The corresponding features can further cooperate to impede movement of the actuating member in a second, opposite direction after installation of the clamp. As a result, the corresponding features on the clamp housing and the clamp actuating member can provide a progressive ratcheting effect when locking the clamp in place and at the same time can help to impede detrimental loosening of the clamp after installation.

FIGS. 1A-1J show a variety of exemplary embodiments of housings 10 that include an exemplary locking feature 15.

Figure 1A:
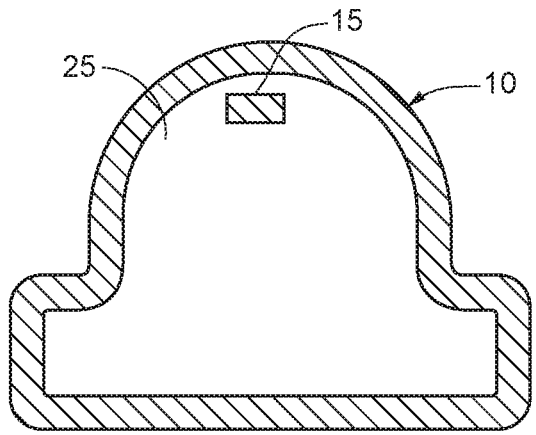
FIGS. 1A-1J show a variety of exemplary embodiments of housings including an exemplary locking feature.
Figure 1B:
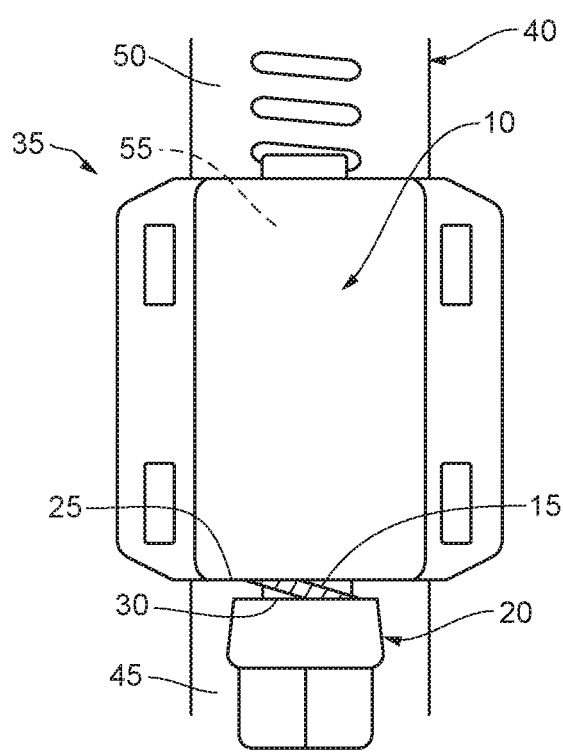
Figure 1C:
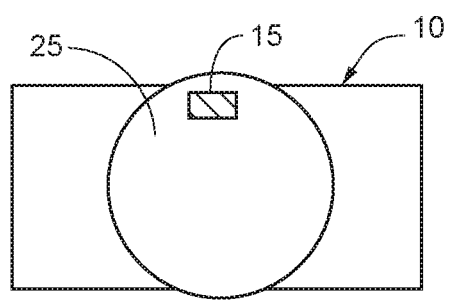
Figure 1D:
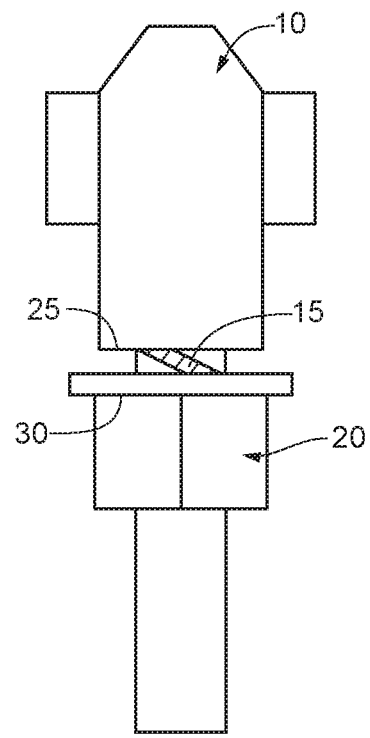
Figure 1E:
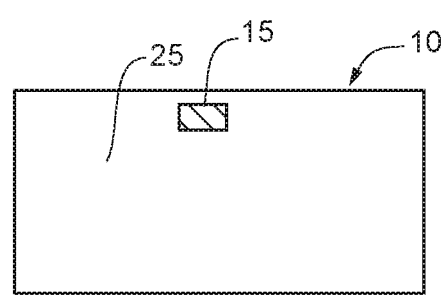
Figure 1F:
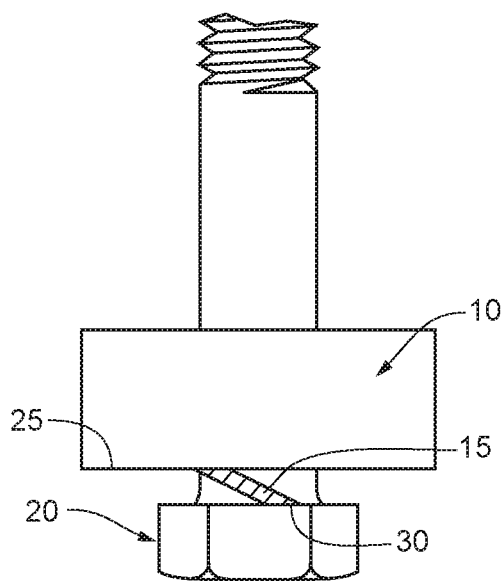

Namely, FIG. 1A shows a side elevational view of an exemplary worm gear housing from a side interfacing with a surface of an actuating member and FIG. 1B shows a top plan view of the worm gear housing in FIG. 1A interfacing with an actuating member 20. FIG. 1C shows a side elevational view of an exemplary V-Band/T-Bolt housing from a side interfacing with a surface of an actuating member and FIG. 1D shows a top plan view of the V-Band/T-Bolt housing in FIG. 1C interfacing with an actuating member 20. FIG. 1E shows a side elevational view of an exemplary barrel clamp housing from a side interfacing with a surface of an actuating member and FIG. 1F shows a top plan view of the barrel clamp housing in FIG. 1E interfacing with an actuating member 20. Any other types of housing suitable for use in clamp devices can also be considered as appropriate for use as a housing disclosed herein.

Figure 1G:
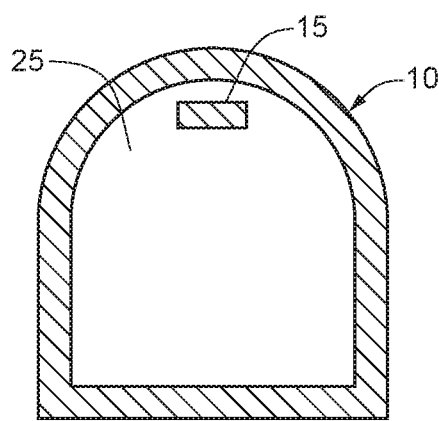
Figure 1H:
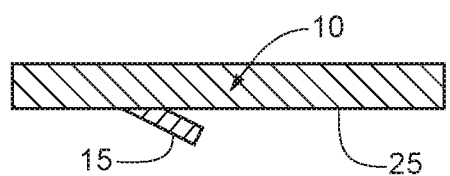
Figure 1I:
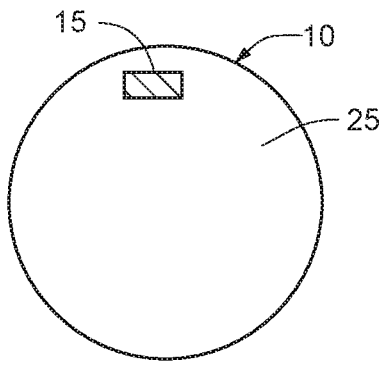
Figure 1J:
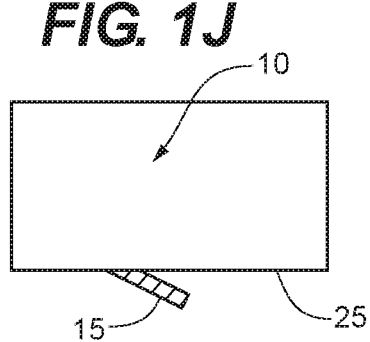

In some cases, the housing 10 can include both a main body and a separate intermediate body. The separate intermediate body can include the locking feature 15 and the separate intermediate body can be positioned between the main body and the actuating member. FIG. 1G shows a side elevational view of an exemplary embodiment of a separate intermediate body of a housing from a side interfacing with a surface of an actuating member and FIG. 1H shows a top plan view of the separate intermediate body in FIG. 1G. FIG. 1I shows a side elevational view of another exemplary embodiment of a separate intermediate body of a housing from a side interfacing with a surface of an actuating member and FIG. 1J shows a top plan view of the separate intermediate body in FIG. 1I. For instance, the intermediate body of FIGS. 1G-1H or FIGS. 1I-1J having the locking feature 15 could be positioned between any of the main bodies shown in FIGS. 1A-1F and the actuating member 20. The surface of the intermediate body having the locking feature 15 could be directly facing the actuating member 20 when so positioned. In this way, the housing 10 would comprise both the main body and the separate intermediate body.

As shown in the example of FIGS. 1A-1J, the housing 10 has a surface 25 from which the locking feature 15 extends outwardly. The surface 25 in this example is an outer surface of the housing 10 on a side of the housing 10 that may contact the actuating member 20. In some instances, the locking feature 15 can be a point extending furthest out from the surface 25. The locking feature 15 can extend out from the surface 25 at an angle, for instance, between twenty five and ninety degrees to the surface 25. The example locking feature 15 as shown here can have a generally rectangular cross-sectional shape. The locking feature 15 may be integral or non-integral tabs (e.g., made of separate and secondary material) to the housing 10. The surface 25 can interface with a surface 30 of the actuating member 20 such that the locking feature 15 contacts the surface 30 of the actuating member 20.

The example of FIG. 1B shows a relevant portion of an embodiment of a clamp 35. The clamp 35 includes the housing 10 and actuating member 20 as described. The actuating member 20 can be seated at the housing 10. The clamp 35 further includes a band 40 having a first portion 45 and a second portion 50. The band can be configured to wrap around a tubing component (e.g., a hose at a connection fitting). The first portion 45 of the band 40 can be secured to the housing 10, for instance such that the first portion 45 stays at a constant position relative to the housing 20. The second portion 50 of the band 40 can extend within a slot 55 defined by the housing 20. The actuating member 20 can be configured when actuated (e.g., torqued, translated, etc.) to move the second portion 50 of the band 40 relative to the housing 20. For instance, the actuating member 20 can be configured when actuated in a first direction to draw further length of the second portion 50 of the band 40 into the slot 55. Thus, the actuating member 20 can be configured when actuated in the first direction to tighten the clamp 35. As the actuating member 20 is further actuated in the first direction, the actuating member 20 can be configured to progressively move the second portion 50 of the band 40 and further tighten the clamp 35. The other illustrated housing and actuating member embodiments can similarly be part of an appropriate clamp embodiment.

As can be seen from illustrated embodiments, actuation of the actuation member 20 results in relative movement between the surface 30, of the actuating member 20, and the surface 25, of the housing 10.

FIGS. 2A-2J show the respective housings 10 as described previously for FIGS. 1A-1J with a different exemplary locking feature 60. Like reference characters used here indicate like features described previously.

Figure 2F:
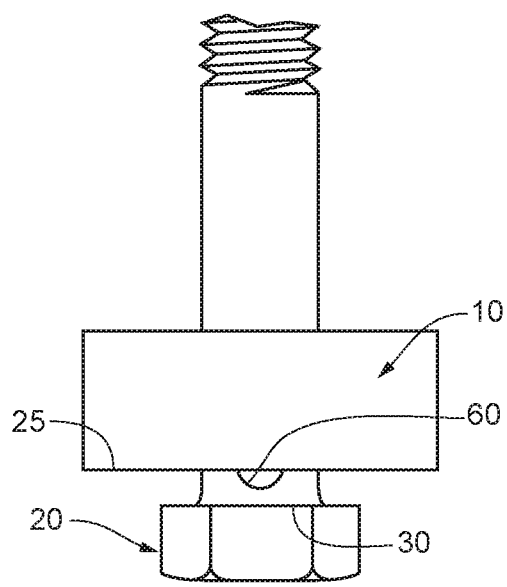

Namely, FIG. 2A shows a side elevational view of an exemplary worm gear housing from a side interfacing with a surface of an actuating member and FIG. 2B shows a top plan view of the worm gear housing in FIG. 2A interfacing with an actuating member 20. FIG. 2C shows a side elevational view of an exemplary V-Band/T-Bolt housing from a side interfacing with a surface of an actuating member and FIG. 2D shows a top plan view of the V-Band/T-Bolt housing in FIG. 2C interfacing with an actuating member 20. FIG. 2E shows a side elevational view of an exemplary barrel clamp housing from a side interfacing with a surface of an actuating member and FIG. 2F shows a top plan view of the barrel clamp housing in FIG. 2E interfacing with an actuating member 20. Any other types of housing suitable for use in clamp devices can also be considered as appropriate for use as a housing disclosed herein.

Figure 2G:
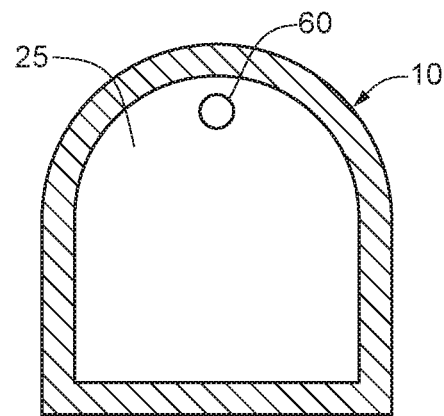
Figure 2H:
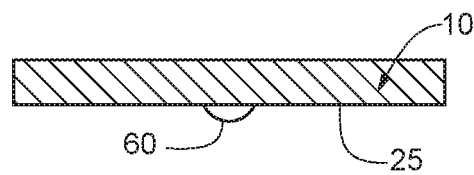
Figure 2I:
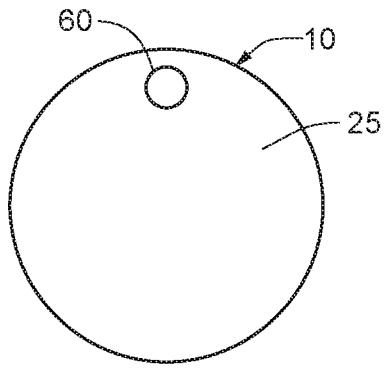
Figure 2J:
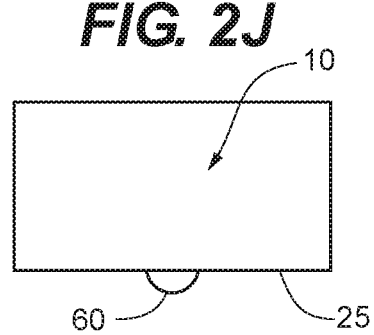
Figure 3A:
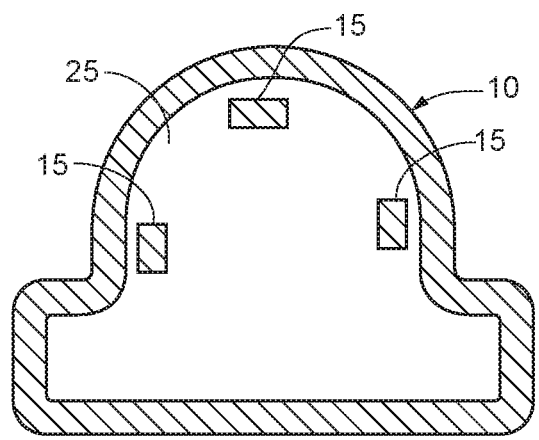
FIGS. 3A-3J show the variety of housings of FIGS. 1A-1J with multiple exemplary locking features.
Figure 3B:
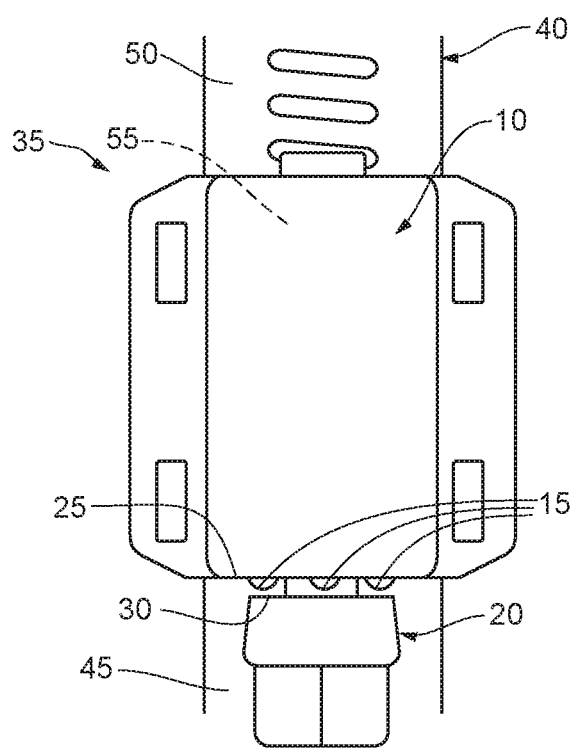
Figure 3C:
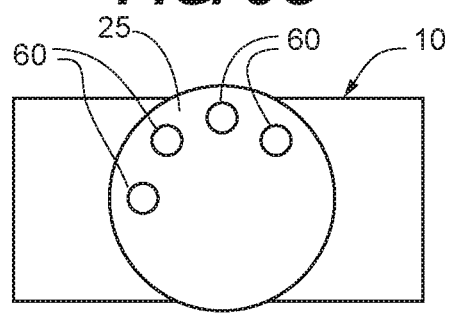
Figure 3D:
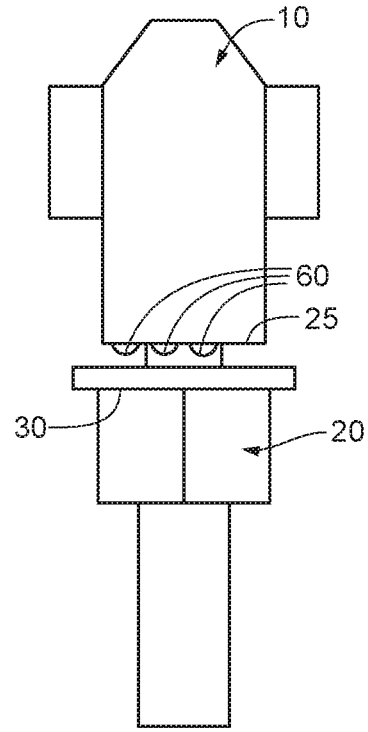
Figure 3E:
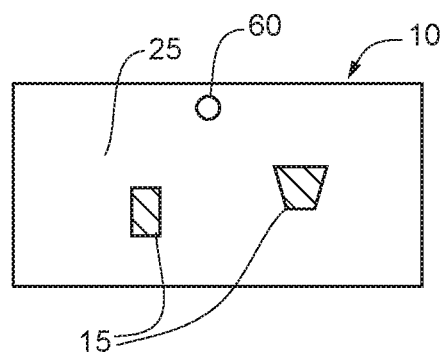
Figure 3F:
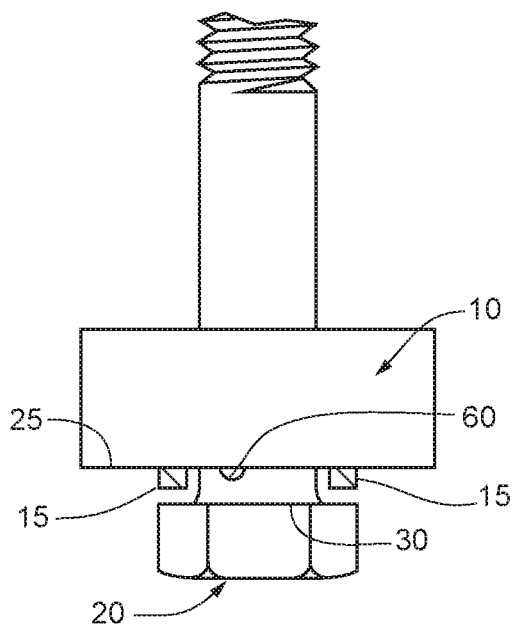
Figure 3G:
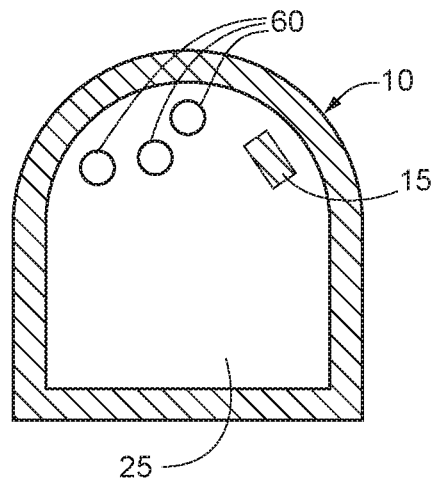
Figure 3H:
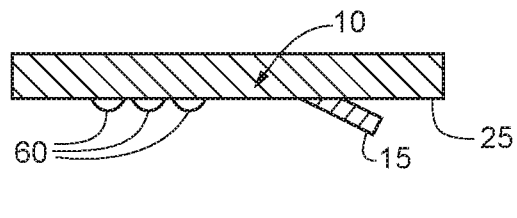
Figure 3I:
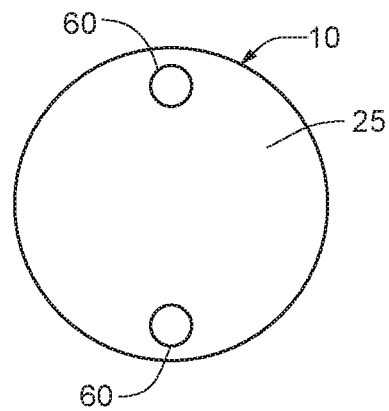
Figure 3J:
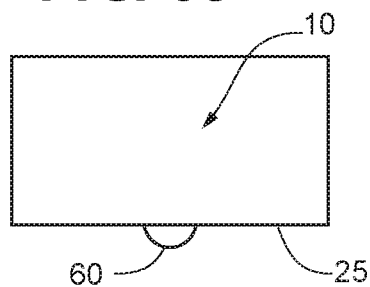

As similar to that noted previously, in some cases, the housing 10 can include both a main body and a separate intermediate body. The separate intermediate body can include the locking feature 60 and the separate intermediate body can be positioned between the main body and the actuating member. FIG. 2G shows a side elevational view of an exemplary embodiment of a separate intermediate body of a housing from a side interfacing with a surface of an actuating member and FIG. 2H shows a top plan view of the separate intermediate body in FIG. 2G. FIG. 2I shows a side elevational view of another exemplary embodiment of a separate intermediate body of a housing from a side interfacing with a surface of an actuating member and FIG. 2J shows a top plan view of the separate intermediate body in FIG. 2I. For instance, the intermediate body of FIGS. 2G-2H or FIGS. 2I-2J having the locking feature 60 could be positioned between any of the main bodies shown in FIGS. 2A-2F and the actuating member 20. The surface of the intermediate body having the locking feature 60 could be directly facing the actuating member 20 when so positioned. In this way, the housing 10 would comprise both the main body and the separate intermediate body.

As shown in the example of FIGS. 2A-2J, the housing 10 has a surface 25 from which the locking feature 60 extends outwardly. In some instances, the locking feature 60 can be a point extending furthest out from the surface 25. The example locking feature 60 as shown here can have a generally curved surface that extends out from the surface 25. For instance, the locking feature 60 may have a generally semi-elliptical or circular cross-sectional shape. The locking feature 60 may be integral or non-integral tabs (e.g., made of separate and secondary material) to the housing 10. The surface 25 can interface with a surface 30 of the actuating member 20 such that the locking feature 60 interfaces with the surface 30 of the actuating member 20.

FIGS. 3A-3J show the variety of housings 10 as described previously with multiple exemplary locking features 10 and/or 60 extending out from the surface 25 of the housings 10. Each of the views illustrated in 3A-3J corresponds to the view shown in respective FIGS. 1A-1J and 2A-2J. In addition, like reference characters used here indicate like features described previously.

As noted, the housing 10 can include two or more locking features 10 and/or 60 extending out from the surface 25 of housing 10. The locking features 10 and/or 60 can be spaced about a portion of the surface 25. As shown, a first locking feature 10 or 60 is spaced along the surface 25 of the housing 10 from a second locking feature 10 or 60. For example, spacing between the locking features 10 and/or 60 about the portion of the surface 25, for instance, can be generally equal between a number of the locking features 10 and/or 60. In examples where two different types of locking features 10 and 60 are included on the surface 25, the locking features can be grouped on a portion of the surface 25 by like type or intermixed on a portion of the surface 25 among different types.

Figure 4A:
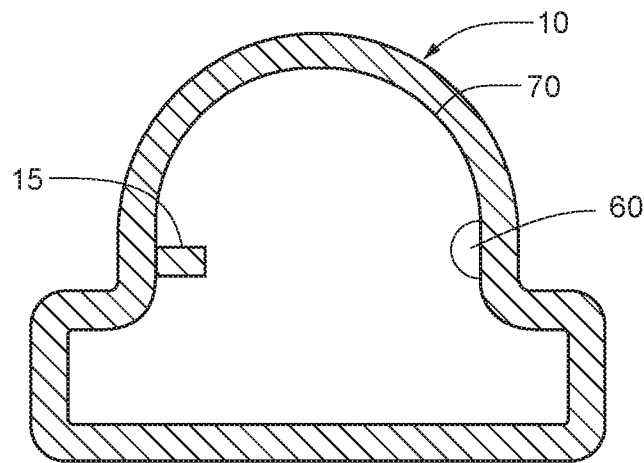
FIGS. 4A-4B show an exemplary embodiment of a housing with multiple locking feature embodiments at an interior surface of the housing.
Figure 4B:
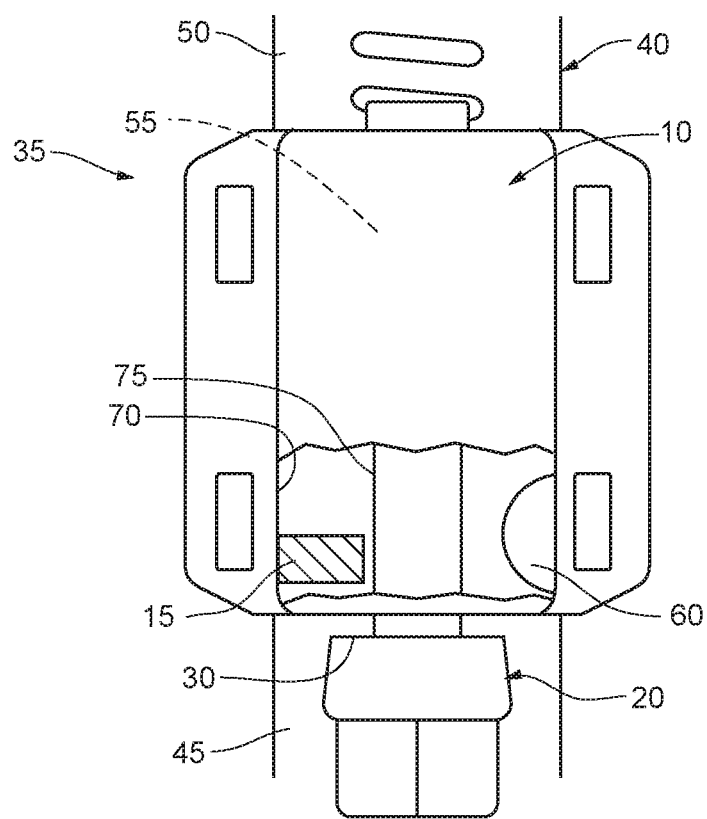

FIGS. 4A and 4B show an exemplary embodiment of housing 10 with multiple locking feature embodiments 10 and 60 at an interior surface of the housing 10. Like reference characters used here indicate like features described previously. FIG. 4A illustrates a cross-sectional view taken through a longitudinal axis of the housing 10 and FIG. 4B illustrates a top plan view of the housing 10 interfacing with an actuating member 20. A portion of FIG. 4B is cut away in order to show an interior surface 70 of the housing 10.

As shown in the example of FIGS. 4A and 4B, locking features 10 and 60 extend outwardly from the interior surface 70 of the housing 10. The actuating member 20 can be seated within the housing 10 at the interior surface 70, as shown in the example here. Thus, a surface 75 of the actuating member 20 can extend within the housing 20 and interface with the interior surface 70. In this way, the surface 75 of the actuating member 20 can contact one or more locking features 15, 60 when seated at the housing 10. Where two or more locking features 10, 60 are included, as here, the locking features 10, 60 can be spaced about the interior surface 70 and, for instance, aligned along a common circumferential location of the interior surface 70.

Figure 5A:
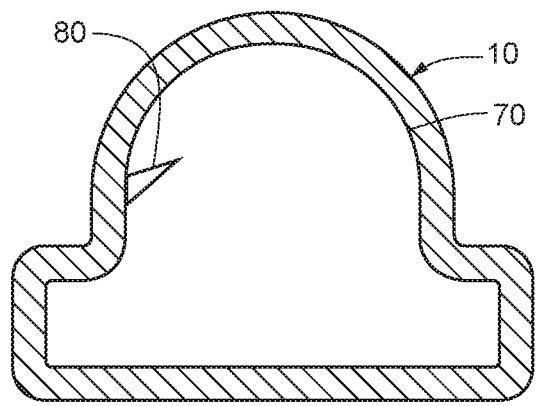
FIGS. 5A-5H show a variety of exemplary embodiments of housings with a further exemplary locking feature.
Figure 5B:
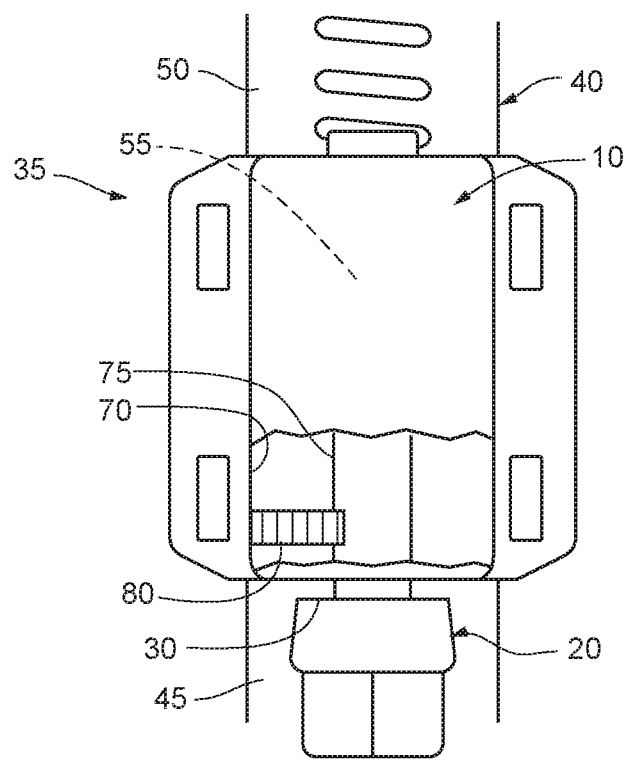
Figure 5C:
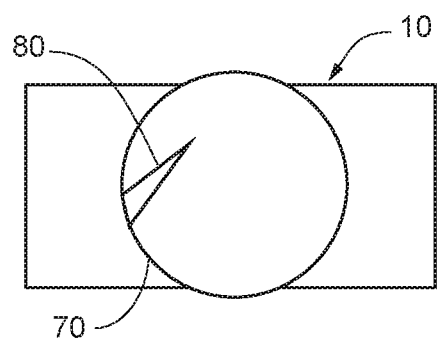
Figure 5D:
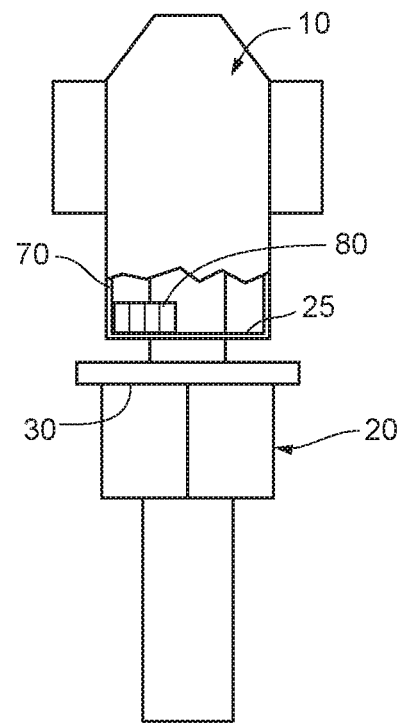
Figure 5E:
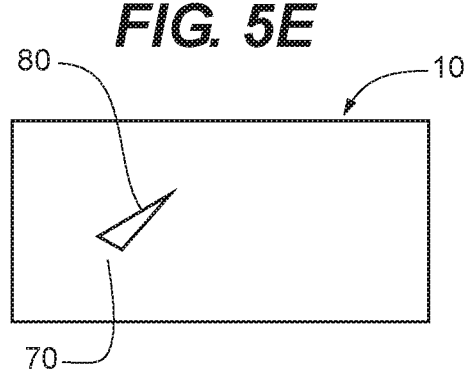
Figure 5F:
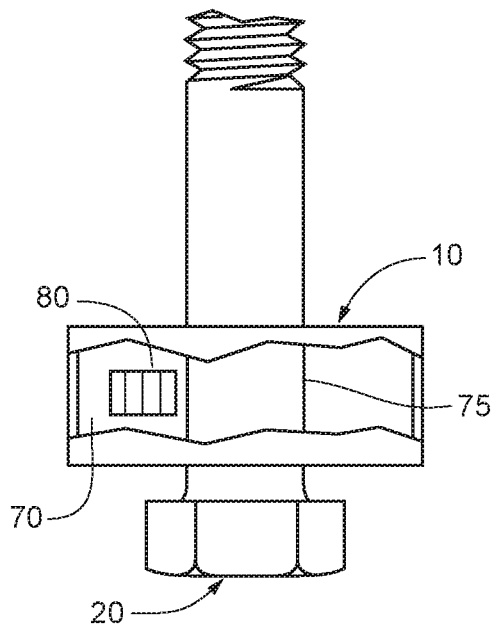
Figure 5G:
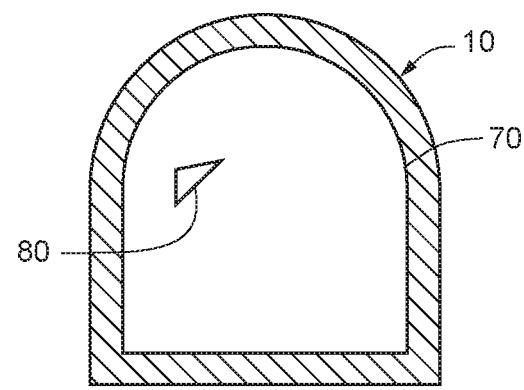
Figure 5H:
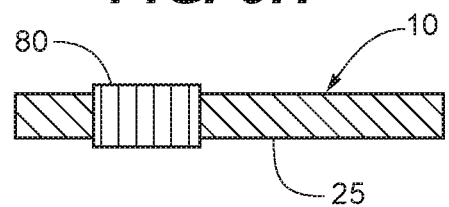

FIGS. 5A-5H show a variety of exemplary embodiments of housings 10 with a further exemplary locking feature 80. Like reference characters used here indicate like features described previously. FIGS. 5A, 5C, 5E, and 5G each illustrates a cross-sectional view taken through a longitudinal axis of the housing 10 while FIGS. 5B, 5D, 5F, and 5H each illustrates a top plan view of the housing 10, of respective FIGS. 5A, 5C, 5E, and 5G, interfacing with an actuating member 20. A portion of each of FIGS. 5B, 5D, and 5F is cut away in order to show the interior surface 70 of the housing 10.

As shown in FIGS. 5A-5H, the locking feature 80 extends outwardly from an interior surface 70 of the housing 10. As noted, the actuating member 20 can be seated within the housing 10 at the interior surface 70 such that the surface 75 of the actuating member 20 can extend within the housing 20 and interface with the interior surface 70. As a result, the surface 75 of the actuating member 20 can contact the locking feature 80 when seating at the housing 10. As one example, the locking feature 80 can be a pawl that is configured to mechanically engage mating features of the surface 75 of the actuating member 20. Such a pawl can be configured with a bias force against the surface 75 and act to engage a mating feature on the surface 75 as the actuating member 20 is actuated. The bias force can, for instance, help to resist actuation of the actuating member 20 is a reverse direction.

Figure 6A:
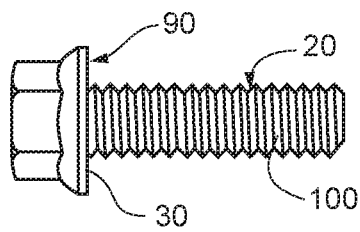
FIGS. 6A-6D show an embodiment of an actuating member with a plurality of mating features.
Figure 6B:
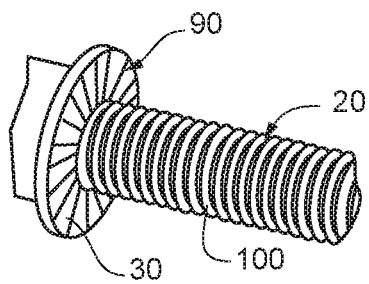
Figure 6C:
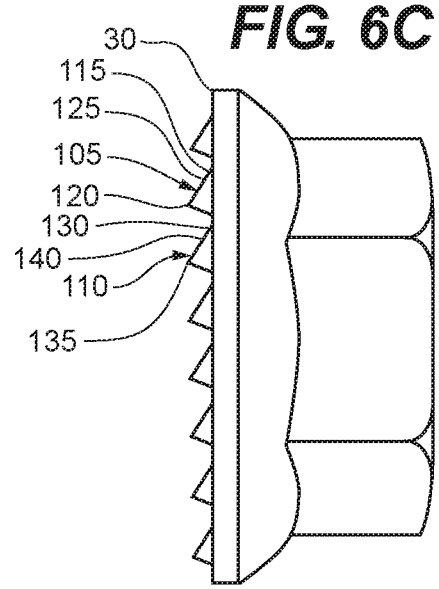
Figure 6D:
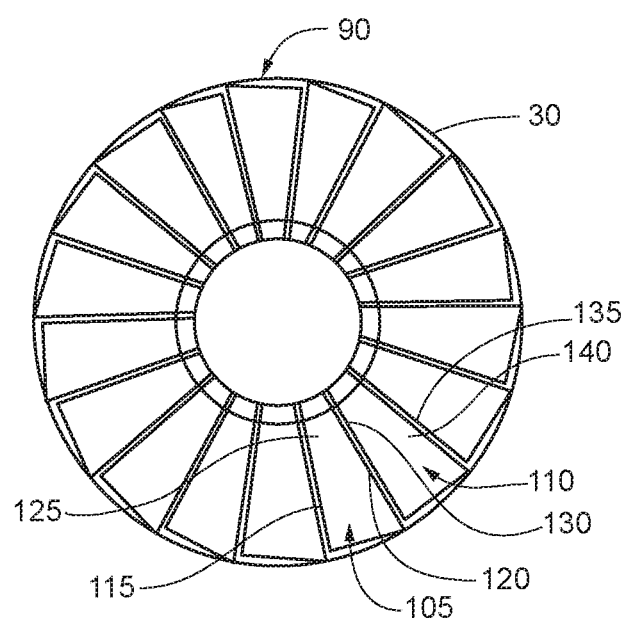

FIGS. 6A-6D show an embodiment of the actuating member 20. The actuating member 20 includes a plurality of mating features 90 and a threaded shank 100. FIG. 6A illustrates a side elevational view of the actuating member 20, FIG. 6B shows a perspective view of the actuating member 20, FIG. 6C shows a close-up side elevational view of a portion of the actuating member 20, and FIG. 6D shows a bottom elevational view of the portion of the actuating member in FIG. 6C.

As noted, the actuating member 20 includes a plurality of mating features 90. As shown in the example here, the plurality of mating features 90 extend outwardly from the surface 30 of the actuating member 20. For instance, the surface 30 can be a bottom of the actuation member 20 (e.g., screw, bolt, nut, etc.) head portion. As described previously, the surface 30 of the actuating member 20 can interface with, and contact, the surface (e.g., surface 25) of the housing, for instance the surface 30 of the actuating member 20 that contacts the outer surface of the housing 10 having an embodiment of a locking feature described previously. Accordingly, the mating features 90 can extend outwardly from the surface 30 of the actuating member 20 such that when the actuating member 20 is seated at the housing the one or more locking features on the housing surface can contact the mating features 90.

As shown in the illustrated example, the plurality of mating features 90 can include a first mating feature 105 and a second mating feature 110. The plurality of mating features 90 can each be spaced about a circumference of the surface 30 of the actuating member 20. Namely, the first mating feature 105 is circumferentially spaced from the second mating feature 110 about the surface 30. In the illustrated example, a number of mating features 90 are continuously spaced around the circumference of the surface 30.

The first mating feature 105 can include a first leading edge 115 at a first circumferential location on the surface 30 and a first trailing edge 120 at a second circumferential location on the surface 30. As shown, the first circumferential location of the first leading edge 115 is spaced from the second circumferential location of the first trailing edge 120 about the circumference of the surface 30. A distance between the first leading edge 115 and the first trailing edge 120 can define a width of the first mating feature 105. In the illustrated example, the width of the first mating feature 105 is less at an inner portion of the first mating feature 105 (e.g., an end adjacent the shank 100) than at an outer portion of the first mating feature 105 (e.g., an end opposite the shank 100). As also shown in the illustrated example, the width of the first mating feature 105 is greatest at the outer portion and reduces proceeding toward the inner portion. The other mating features, including the second mating feature 110, are also shown in the illustrated example with a similar width.

In some examples, such as in the illustrated embodiment, the first leading edge 115 can be at a first elevation relative to the surface 30 while the first trailing edge 120 can be at a second elevation relative to the surface 30 that is different from the first elevation. In various embodiments, such a first elevation could be flush with the surface 30, extended outward from the surface 30, of indented inward in the surface 30. For instance, the second elevation of the first trailing edge 120 can be greater than the first elevation of the first leading edge 115. In one example, the first elevation of the first leading edge 115 can vary (e.g., increase) proceeding along the first leading edge 115 from the inner portion toward an outer portion of the first mating feature 105. In such an example, the second elevation of the second trailing edge 120 may also vary proceeding along the second trailing edge 120 from the inner portion toward an outer portion of the first mating feature 105. The variance in elevation, in such example, from the inner portion toward an outer portion of the first mating feature 105 of the first leading edge 115 and first trailing edge 120 can be the same or different. Other mating features can have a same or similar configuration.

The first mating feature 105 can also include a surface 125 extending a length between the first circumferential location of the first leading edge 115 on the surface 30 and the second circumferential location of the first trailing edge 120 on the surface 30. Where the elevation of the first leading edge 115 and the first trailing edge 120 are different, the surface 125 can extend this length at an angle from the first leading edge 115 to the first trailing edge 120. For example, where the second elevation of the first trailing edge 120 is greater than the first elevation of the first leading edge 115, the surface 125 can extend the length between first leading edge 115 and the first trailing edge 120 at an inclined angle (e.g., an inclined angle as measured from the surface 30 outward).

The second mating feature 110 can include a second leading edge 130 at a third circumferential location on the surface 30 and a second trailing edge 135 at a fourth circumferential location on the surface 30. As shown, the third circumferential location of the second leading edge 130 is spaced from the fourth circumferential location of the second trailing edge 135 about the circumference of the surface 30. In some examples, such as in the illustrated embodiment, the second leading edge 130 can be at a third elevation relative to the surface 30 while the second trailing edge 135 can be at a fourth elevation relative to the surface 30 that is different from the third elevation. For instance, the fourth elevation of the second trailing edge 135 can be greater than the third elevation of the second leading edge 130.

Similar to the surface 125, the second mating feature 110 can include a surface 140 extending a length between the third circumferential location of the second leading edge 130 on the surface 30 and the fourth circumferential location of the second trailing edge 135 on the surface 30. The surface 140 may likewise extend this length at an angle, such as an inclined angle, from the second leading edge 130 to the second trailing edge 135. In one embodiment, the surface 140 of the second mating feature 110 can be at an inclined angle that is greater than the inclined angle of the surface 125 of the first mating feature 105 (e.g., such that the second trailing edge 135 is at a greater elevation than the second trailing edge 120). The inclined angle of the respective surfaces of mating features may, for instance, continually increase circumferentially progressing around the surface 30.

As shown, the first mating feature 105 can be circumferentially adjacent to the second mating feature 110 on the surface 30. As such, the third circumferential location of the second leading edge 130 can be adjacent to the second circumferential location of the first trailing edge 120. As shown in the illustrated embodiment, the third elevation of the second leading edge 130 is less than the second elevation of the first trailing edge 120.

In various embodiments, mating features can be at the same or different elevations relative to the surface 30. For instance, the first mating feature 105 can be at a different elevation relative to the surface 30 than the second mating feature 110. As an example, the second mating feature 110 can extend outward from the surface 30 at a greater elevation than the first mating feature 105 as references along a base of these mating features aligned with the surface 30. This could include the second leading edge 130 extending further out relative to the surface 30 than the first leading edge 115 and/or the second trailing edge 135 extending further out relative to the surface 30 than the first trailing edge 120. Though, in such embodiments, the third elevation of the second leading edge 130 can still be less than the second elevation of the first trailing edge 120.

The plurality of mating features 90 can be configured to engage with a locking feature of the housing. The locking feature of the housing can be configured to consecutively engage one of the plurality of mating features 90 when the actuating member 20 is actuated (e.g., torqued, translated, etc.). The actuating member 20 can be configured to progressively move the second portion of the band relative to the housing upon each of such consecutive engagements between the locking feature and one of the plurality of mating features 90. For example, the threaded shank 100 can contact the second portion of the band such that upon actuation of the actuating member 20 in a first direction further length of the second portion of the band is brought within the slot of the housing acting to tighten the clamp device upon each of such consecutive engagements between the locking feature and one of the plurality of mating features 90.

For example, the plurality of mating features 90 can be configured on the surface 30 of the actuating member 20 such that when the actuating member 20 is actuated in a first direction to tightening the clamp, the locking feature of the housing first comes into contact with the first mating feature 105. As the actuating member 20 continues to be actuated in the first direction, the locking feature of the housing then comes into contact with the second mating feature 110.

More specifically, as the actuating member 20 is actuated in the first direction the locking feature of the housing moves along the surface 125 and eventually sits between the first trailing edge 120 of the first mating feature 105 and the second leading edge 130 of the second mating feature 110. Here, the locking feature can contact the first trailing edge 120 and the locking feature can be considered as engaged with the first mating feature 105. In some cases, this engagement may provide a tactile "ratcheting effect" feel during installation of the clamp, and in further cases provide a "clicking" sound during tightening of the clamp. If the actuating member 20 continues to be actuated in the first direction, the locking feature will move along the surface 140 and eventually sit between the second trailing edge 135 and a third leading edge of a third mating feature. Here, the locking feature can contact the second trailing edge 135 and the locking feature can be considered as engaged with the second mating feature 110. Again, in some cases, this engagement with the second mating feature 110 may provide a tactile "ratcheting effect" feel (and in some further cases a "clicking sound") during installation of the clamp. In this way, a user can be alerted to successive tightening of the clamp. Where the second mating feature 110 is at a different elevation relative to the surface 30 from the first mating feature 105, additional actuation force (e.g., greater actuation force) may need to be applied to the actuation member to engage the second mating feature 110.

Moreover, the configuration of the plurality of mating features 90 can help to impede actuation of the actuation member 20 is a second opposite direction which would act to loosen the clamp (e.g., unintentionally loosen the clamp when after it is installed). The difference in elevation between the first trailing edge 120 and the first leading edge 130 can act to hold the locking feature of the housing from rotation back over the first trailing edge 120. In addition, where adjacent mating features around the surface 30 are of increasingly different elevations, the force needed in the second opposite direction to loosen the clamp becomes increasingly greater. The specific dimensions of the locking feature and the mating features can be made as appropriate for specific applications of the clamp (e.g., hose clamp) device.

Figure 7:
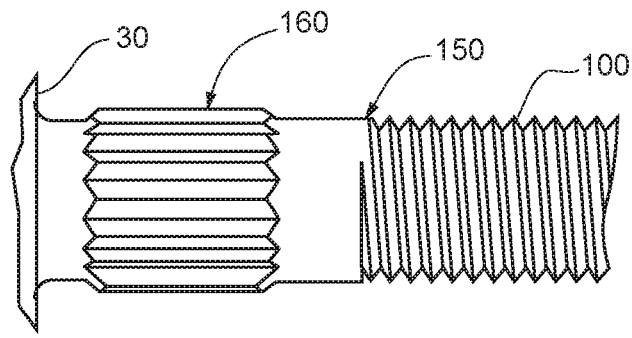
FIG. 7 shows an embodiment of another actuating member with a further embodiment of a plurality of mating features.

FIG. 7 shows an embodiment of another actuating member 150 with a further embodiment of a plurality of mating features 160. In particular, FIG. 7 shows a side elevational view of a portion of actuating member 150.

In this example, the plurality of mating features 160 are positioned on a shank portion of the actuation member 150 at a location spaced along the shank portion from each of the actuating member head and the threads 100. The plurality of mating features 160 can be similar to the plurality of mating features similarly described. Alternatively, the plurality of mating features 160 can be made up of a series of alternating peak elevations and valley elevations around a circumference of the location along the shank portion.

This embodiment of the actuating member 150 can be useful for seating within embodiments of the housing where the locking feature extends outward from the interior surface of the housing. Accordingly, the locking feature can be configured to consecutively contact and thereby engage one of the plurality of mating features 160 as the actuating member 150 is actuated in the first direction to tighten the clamp device.

Figure 8:
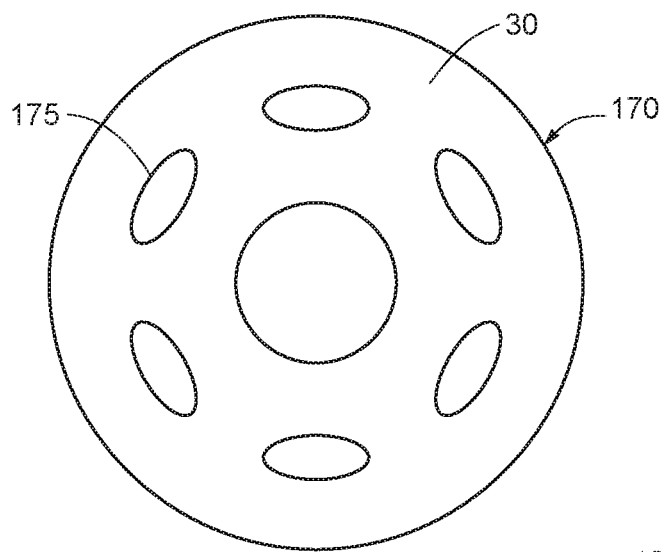
FIG. 8 shows a further embodiment of an actuating member with an alternative embodiment of the plurality of mating features.

FIG. 8 shows a further embodiment of an actuating member 170 with an alternative embodiment of the plurality of mating features 175. The plurality of mating features 175 are spaced about a circumference of the surface 30. As shown here, the plurality of mating features 175 are generally of an elongated elliptical shape. Similar to other embodiments of the plurality of mating features disclosed herein, the locking feature can be configured to consecutively contact, and thereby consecutively engage, one of the plurality of mating features 175. In one example, each of the plurality of mating features 175 can alternate as extending outwardly from the surface 30 an indenting inward into the surface 30.

Figure 9:
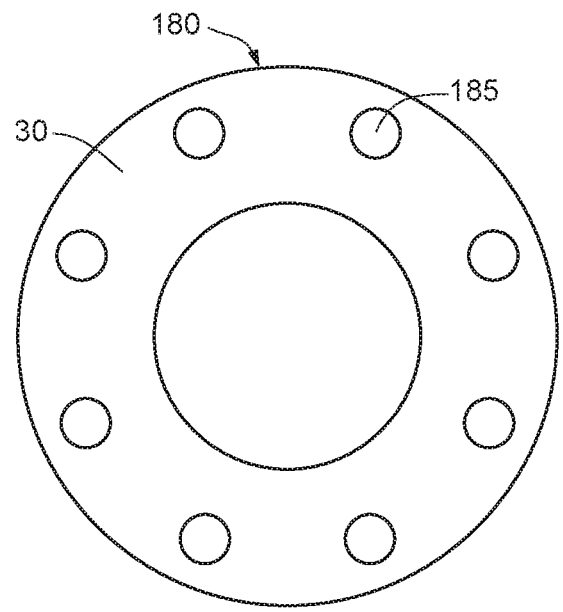
FIG. 9 shows an additional embodiment of an actuating member with another alternative embodiment of the plurality of mating features.

FIG. 9 shows an additional embodiment of an actuating member 180 with another alternative embodiment of the plurality of mating features 185. The plurality of mating features 185 are spaced about a circumference of the surface 30. As shown here, the plurality of mating features 185 are generally of a circular shape. Similar to other embodiments of the plurality of mating features disclosed herein, the locking feature can be configured to consecutively contact, and thereby consecutively engage, one of the plurality of mating features 185. In one example, each of the plurality of mating features 185 can alternate as extending outwardly from the surface 30 an indenting inward into the surface 30.

Also disclosed herein are exemplary embodiments of methods of securing a clamp. One embodiment of such a method includes at a first step bringing a first locking feature that extends outwardly from a surface of a housing into contact with a surface of an actuating member having a plurality of mating features each extending outwardly and spaced apart about a circumference of the surface of the actuating member. The method further includes at a second step actuating (e.g., torqueing) the actuating member to move a portion of a band in a first direction relative to the housing. The second step can further include the first locking feature engaging a first mating feature of the plurality of mating features. And, in addition, upon further actuation of the actuating member the first locking feature engages a second mating feature of the plurality of mating features to further move the portion of the band in the first direction relative to the housing. The second mating feature can be circumferentially spaced about the surface of the actuating member from the first mating feature.

In a further embodiment of such method, the first mating feature has a first leading edge at a first circumferential location on the surface of the actuating member and a first trailing edge at a second circumferential location on the surface of the actuating member. The second circumferential location is spaced from the first circumferential location. The first leading edge is at a first elevation and the second leading edge is at second elevation with the second elevation being greater than the first elevation. In this embodiment of the method, engaging the first locking feature and the first mating feature includes the first locking feature contacting the first trailing edge. In this embodiment, movement of the band in a second direction opposite the first direction relative to the housing can be impeded by the first locking feature contacting the first trailing edge.

In an additional embodiment of such method, the second mating feature has a second leading edge at a third circumferential location on the surface of the actuating member and a second trailing edge at a fourth circumferential location on the surface of the actuating member. The third circumferential location is adjacent to the second circumferential location. The second leading edge is at a third elevation and the second trailing edge is at a fourth elevation with the fourth elevation being greater than the third elevation and the third elevation being less than the second elevation. In this embodiment of the method, upon the further actuation of the actuating member in the first direction relative to the housing, the first locking feature moves from engaging the first mating feature to engaging the second mating feature.

Engaging the first locking feature and the second mating feature includes the first locking feature contacting the second trailing edge.

In the exemplary embodiment of this method, the first mating feature may further have a first mating feature surface that extends a length between the first circumferential location on the surface of the actuating member and the second circumferential location on the surface of the actuating member. The first mating feature surface can extend the length at an inclined angle from the first leading edge to the first trailing edge. Here, when engaging the first locking feature and the first mating feature the first locking feature can be moved along the first mating feature surface (e.g., at the inclined angle).

Various exemplary embodiments have been disclosed herein for purposes of explaining a number features. It will be understood that the scope of protection is defined by the words of the following claims.

The invention claimed is:

1. A clamp comprising:
a housing defining a first slot, the housing having a surface from which a first locking feature extends outwardly, the first locking feature forming a point extended out from the surface of the housing, the surface of the housing lacking other locking features;
a band having a first portion secured to the housing and a second portion extending within the first slot; and
an actuating member seated at the housing, the actuating member having a surface interfacing with the first locking feature and from which a plurality of mating features each extend outwardly, the plurality of mating features including a first mating feature and a second mating feature being spaced about a circumference of the surface of the actuating member,
wherein the actuating member is configured when actuated to move the second portion of the band relative to the housing, and wherein the first locking feature is configured to consecutively engage the first mating feature and the second mating feature when the actuating member is actuated such that when the first locking feature engages the first mating feature the surface of the housing lacking other locking features is at the second mating feature and when the first locking feature engages the second mating feature the surface of the housing lacking other locking features is at the first mating feature.

2. The clamp of claim 1, wherein the actuating member is configured to progressively move the second portion of the band relative to the housing upon each consecutive engagement of the first locking feature with one of the plurality of mating features.

3. The clamp of claim 1, wherein the first mating feature of the plurality of mating features comprises a first leading edge at a first circumferential location on the surface of the actuating member and a first trailing edge at a second circumferential location on the surface of the actuating member, the second circumferential location being spaced from the first circumferential location, and wherein the first leading edge is at a first elevation and the first trailing edge is at second elevation, the second elevation being different than the first elevation.

4. The clamp of claim 3, wherein the second mating feature of the plurality of mating features comprises a second leading edge at a third circumferential location on the surface of the actuating member and a second trailing edge at a fourth circumferential location on the surface of the actuating member, the third circumferential location being adjacent to the second circumferential location, and wherein the second leading edge is at a third elevation and the second trailing edge is at a fourth elevation, the fourth elevation being greater than the third elevation, and wherein the third elevation is less than the second elevation.

5. The clamp of claim 4, wherein the first locking feature is configured to sit between the first trailing edge and the second leading edge and contact the first trailing edge when engaged with the first mating feature, and wherein the first locking feature is configured to sit between the second trailing edge and a third leading edge of a third mating feature of the plurality of mating features and contact the second trailing edge when engaged with the second mating feature.

6. The clamp of claim 3, wherein the first mating feature further comprises a first mating feature surface extending a length between the first circumferential location on the surface of the actuating member and the second circumferential location on the surface of the actuating member, and wherein the first mating feature surface extends the length at an inclined angle from the first leading edge to the first trailing edge.

7. The clamp of claim 1, wherein the surface of the housing from which the first locking feature extends is an outer surface of the housing on a side of the housing that contacts the actuating member.

8. The clamp of claim 7, wherein the plurality of mating features are located on the surface of the actuating member that contacts the outer surface of the housing.

9. The clamp of claim 1, wherein the housing comprises a main body and a separate intermediate body, the separate intermediate body being positioned between the main body and the actuating member, and wherein the separate intermediate body includes the surface from which the first locking feature extends outwardly.

10. The clamp of claim 1, wherein a width of the first mating feature is less at an inner portion of the surface of the actuating member than at an outer portion of the surface of the actuating member.

11. A method of securing a clamp, the method comprising the steps of:
bringing a first locking feature that forms a point extended outwardly from a surface of a housing into contact with a surface of an actuating member having a plurality of mating features including a first mating feature and a second mating feature each extending outwardly and spaced apart about a circumference of the surface of the actuating member, the surface of the housing from which the first locking feature extends out lacking other locking features; and
actuating the actuating member to move a portion of a band in a first direction relative to the housing,
wherein actuating the actuating member to move the portion of the band in the first direction relative to the housing comprises the first locking feature engaging the first mating feature of the plurality of mating features and the surface of the housing lacking other locking features being at the second mating feature, and wherein upon further actuation of the actuating member the first locking feature engaging the second mating feature of the plurality of mating features and the surface of the housing lacking other locking features being at the first mating feature to further move the portion of the band in the first direction relative to the housing, the second mating feature being circumferentially spaced about the surface of the actuating member from the first mating feature.

12. The method of claim 11,
wherein the first mating feature comprises a first leading edge at a first circumferential location on the surface of the actuating member and a first trailing edge at a second circumferential location on the surface of the actuating member, the second circumferential location being spaced from the first circumferential location, wherein the first leading edge is at a first elevation and the first trailing edge is at second elevation, the second elevation being greater than the first elevation, and
wherein the first locking feature engaging the first mating feature comprises the first locking feature contacting the first trailing edge.

13. The method of claim 12,
wherein the second mating feature comprises a second leading edge at a third circumferential location on the surface of the actuating member and a second trailing edge at a fourth circumferential location on the surface of the actuating member, the third circumferential location being adjacent to the second circumferential location, and wherein the second leading edge is at a third elevation and the second trailing edge is at a fourth elevation, the fourth elevation being greater than the third elevation, the third elevation being less than the second elevation, and
wherein upon the further actuation of the actuating member in the first direction relative to the housing the first locking feature moves from engaging the first mating feature to engaging the second mating feature, and wherein the first locking feature engaging the second mating feature comprises the first locking feature contacting the second trailing edge.

14. The method of claim 12, wherein movement of the band in a second direction opposite the first direction relative to the housing is impeded by the first locking feature contacting the first trailing edge.

15. The method of claim 12,
wherein the first mating feature further comprises a first mating feature surface extending a length between the first circumferential location on the surface of the actuating member and the second circumferential location on the surface of the actuating member, the first mating feature surface extending the length at an inclined angle from the first leading edge to the first trailing edge, and
wherein to engage the first locking feature with the first mating feature, the first locking feature is moved along the first mating feature surface.

16. The method of claim 11, wherein bringing the first locking feature into contact with the surface of the actuating member comprises bringing an outer surface of the housing into contact with the actuating member, and wherein the plurality of mating features are located on the surface of the actuating member that contacts the outer surface of the housing.

17. The method of claim 11, wherein actuating the actuating member to move the portion of the band in the first direction relative to the housing comprises applying torque to the actuating member.

* * * * *